United States Patent [19]
Gulick et al.

[11] Patent Number: 5,993,057
[45] Date of Patent: Nov. 30, 1999

[54] APPARATUS FOR DETECTING AND AVERAGING DATA IN A DIGITAL DATA STREAM

[75] Inventors: Dale E. Gulick, Austin, Tex.; Satoru Maeda, Tokyo, Japan; Munehiro Yoshikawa, Tokyo, Japan; Manabu Oonishi, Tokyo, Japan

[73] Assignees: Advanced Micro Devices, Inc., Sunnyvale, Calif.; Sony Corporation, Tokyo, Japan

[21] Appl. No.: 08/374,191

[22] Filed: Jan. 18, 1995

Related U.S. Application Data

[62] Division of application No. 07/918,621, Jul. 21, 1992.

[51] Int. Cl.⁶ .................................................... G11B 27/00
[52] U.S. Cl. ............................ 371/61; 375/226; 375/326; 375/371
[58] Field of Search ............... 371/61, 57.2; 340/870.19, 340/870.2, 825.63, 825.64, 825.65; 345/138; 364/575, 734; 505/830; 377/107, 11, 13, 20; 327/31; 375/226, 344, 236, 345, 340, 371

[56] References Cited

U.S. PATENT DOCUMENTS

| | | | |
|---|---|---|---|
| 3,204,189 | 8/1965 | Trautwein | 371/61 |
| 3,711,773 | 1/1973 | Hekimian et al. | 324/83 R |
| 3,878,334 | 4/1975 | Halpern | 178/69.5 R |
| 3,895,186 | 7/1975 | Yoshida et al. | 178/69.5 F |
| 4,074,358 | 2/1978 | Caputo et al. | 364/514 |
| 4,191,847 | 3/1980 | Mayer | 328/111 |
| 4,412,229 | 10/1983 | Huffman | 364/570 |
| 4,486,752 | 12/1984 | Chihak | 307/234 |
| 4,670,891 | 6/1987 | Salowe et al. | 377/20 |
| 4,692,710 | 9/1987 | Shuartsman | 328/111 |
| 4,920,548 | 4/1990 | Gaussa, Jr. et al. | 376/255 |
| 5,420,904 | 5/1995 | Gulick et al. | 377/107 |

FOREIGN PATENT DOCUMENTS

| | | |
|---|---|---|
| 62-185281 | 8/1987 | Japan . |
| 2 145 205 | 4/1985 | United Kingdom . |

Primary Examiner—Robert W. Beausoliel, Jr.
Assistant Examiner—Stephen C. Elmore
Attorney, Agent, or Firm—Jenkens & Gilchrist, A Professional Corporation

[57] ABSTRACT

An apparatus for averaging pulses in a stream of pulses, which pulses are categorizable into at least two categories, includes structure for isolating the pulses into groupings of pulses, structure for counting the number of pulses of a particular category that occur within a grouping of pulses, and structure for generating an output signal when a predetermined number of pulses of a particular category occur within a grouping of pulses.

9 Claims, 5 Drawing Sheets

APPARATUS FOR DETECTING AND AVERAGING DATA IN A DIGITAL DATA STREAM

This is a division of appliction Ser. No. 07/918,621, filed Jul. 21, 1992.

CROSS-REFERENCE TO RELATED APPLICATIONS

This application is related to the following U.S. Patent Applications:

| Ser. No. | TITLE | INVENTOR(S) |
| --- | --- | --- |
| 07/917,497 | General I/O Port Interrupt Mechanism | Gulick, et al. |
| 07/917,489 | Improved External Memory Access Control for a Processing Unit | Gulick, et al. |
| 07/917,488 | Method of Weak Pull-up Disable and Mechanism Therefor for Use with Microcontroller in Integrated Circuit and Cordless Telephone Using the Integrated Circuit | Bowles, et al. |
| 07/917,503 | Interrupt Mask Disable Circuit and Method | Bowles, et al. |
| 07/918,627 | Integrated Circuit and Cordless Telephone Using the Integrated Circuit | Gulick, et al. |
| 07/918,626 | Modulator Test System | Peterson, et al. |
| 07/918,625 | Keypad Scanner Process and Device and Cordless Telephone Employing the Mechanism | Gulick |
| 07/918,624 | Serial Interface Module and Method | Gulick, et al. |
| 07/918,631 | Low Power Emergency Telephone Mode | Peterson, et al. |
| 07/918,632 | In-Circuit Emulation Capability Mode in Integrated Circuit and Cordless Telephone Using the Integrated Citcuit | Gulick, et al. |
| 07/918,622 | Clock Generator Capable of Shut-down Mode and Clock Generartion Method | Peterson, et al. |

All of the related applications are filed on even date herewith, are assigned to the assignee of the present invention, and are hereby incorporated herein in their entirety by this reference thereto.

BACKGROUND OF THE INVENTION

1. Field of the Invention

The present invention relates to noise detection and treating mechanisms and more particularly, to mechanisms designed to detect and treat bursts of bad data in a digital data stream.

2. Description of Related Art

In any data transmission event, a received signal is modified by various distortions imposed by the transmission system, together with additional unwanted signals that are inserted somewhere between transmission and reception. The latter, unwanted signals are referred to as noise. Noise is a major limiting factor in communications system performance.

There are four major categories of noise: thermal noise, intermodulation noise, crosstalk, and impulse noise.

Thermal noise is caused by thermal agitation of electrons in a conductor. It is present in all electronic devices and transmission media and is a function of temperature. Because thermal noise is uniformly distributed across the frequency spectrum it is frequently referred to as "white noise". Thermal noise cannot be eliminated; therefore, it places an upper bound on communications system performance.

Intermodulation noise is noise that is produced by some nonlinearity in a transmitter, a receiver, or in a transmission system between the transmitter and the receiver. Nonlinearity can be caused by component malfunction, excessive signal strength, or any number of other system abnormalities. Intermodulation noise produces signals at a frequency which is the sum or difference of two original frequencies or multiples of those frequencies. These derived signals can interfere with the intended signals.

Crosstalk is an unwanted coupling between signal paths. Crosstalk can occur by electrical coupling between nearby twisted pair, by coax cable lines carrying multiple signals, or by unwanted signals being picked up by antennas. Crosstalk is usually of the same order of magnitude, or less, of thermal noise.

Thermal noise, intermodulation noise, and crosstalk are all reasonably predictable and have reasonably constant magnitudes. Therefore, it is relatively easy to build communications system that can cope with them. This is not true with regard to the fourth major category of noise, impulse noise.

Impulse noise is noncontinuous, generally consisting of irregular pulses or noise spikes of short duration and relatively high amplitude. Impulse noise can be caused by external electromagnetic disturbances, such as lightning, as well as by faults or defects in the communications system. Because impulse noise is not generally predictable, and because it does not have a generally constant magnitude, it is relatively difficult to cope with.

Impulse noise is generally only a minor annoyance in analog communications system. It can corrupt voice transmission by causing clicks and crackles; however, intelligibility is rarely lost. In digital communications systems, on the other hand, impulse noise is a major problem, being a primary, if not the primary, source of error. For example, a sharp spike of 0.02 second duration can wash out one hundred bits of data being transmitted at 4800 bits per second. Thus, bursty impulse noise can cause substantial errors in digital transmission systems.

Another concept besides noise that plays a role as background to the present invention is jitter. Jitter may be time, amplitude, frequency, or phase related. Along that line, jitter is abrupt, spurious variations in the duration, magnitude, frequency, or phase of the frequency modulation of an interval, successive cycles, or successive pulses of a repetitive wave. Stated more simply, variations in pulse positions cause jitter. Jitter results from a number of causes, some of which are dependent on the pulse pattern being transmitted while others are not. Random forms of jitter are caused by noise, interference, and mistuning of clock circuits. Pattern-dependent jitter results also from clock mistuning, from amplitude-to-phase conversion in clock circuits, and intersymbol interference (ISI), which alters the position of the peaks of the input signal according to the pattern.

It is known that jitter accumulation over a digital link may be reduced by buffering the link with an elastic store and clocking out the digit stream under the control of a highly stable phase-lock loop. The elastic store is effectively a buffer that is initialized to hold a certain number of bits, and which expands and contracts to keep the bit length constant. The phase-lock loop is a device that uses feedback to minimize the deviation from one bit time to the next. It generally accomplishes this by synchronizing a variable local oscillator with the phase of a transmitted signal.

Based upon the foregoing, it should be perceived that noise and jitter are large problems in digital communications systems. Both can cause large losses of data. Although a number of steps have been taken heretofore to deal with those problems, there has yet to have been developed a system or subsystem for a communications system that is extremely effective in coping with them. Accordingly, it should be perceived that it is a shortcoming and deficiency of the prior art that such a system or subsystem has not yet been developed.

SUMMARY OF THE INVENTION

The present invention overcomes the shortcomings and deficiencies of the prior art by providing an apparatus for averaging pulses in a stream of pulses, which pulses are categorizable into at least two categories, which apparatus includes structure for isolating the pulses in groupings of pulses, structure for counting the number of pulses of a particular category that occur within a grouping of pulses, and structure for generating an output signal when a predetermined number of pulses of a particular category occur within a grouping of pulses. The present invention may very usefully be applied in situations in which the pulses are digital bits and in which the two categories of "being in error" and "not being in error" are employed.

In embodiments of the present invention the structure for isolating and/or the structure for counting may be programmable up counters.

The present invention also provides a digital signal receiving system including a receiver, a jitter detector, an averaging mechanism, a speech processor, and a muting mechanism. The receiver receives a digital signal and outputs a clock signal and a related data signal. The jitter detector receives the clock signal and related data signal from the receiver and outputs a stream of bit-by-bit error pulses. The averaging mechanism receives the stream of bit-by-bit error pulses from the jitter detector, counts errors over windows of predetermined size, and generates an error indication output signal if a predetermined number of errors is detected in a particular window. The speech processor operates in parallel with the jitter detector and the averaging mechanism, and it converts the digital signal to an analog signal. The muting mechanism receives the error indication signal from the averaging mechanism and manipulates the analog signal based upon the error indication signal state.

The present invention also provides a method for averaging pulses in a stream of pulses. The method provided by the present invention include the steps of isolating the pulses into groupings of pulses, counting the number of pulses of a particular kind occurring within a grouping of pulses, and generating an output signal when a predetermined number of pulses of a particular kind occur within a grouping of pulses.

Accordingly, it is an object of the present invention to provide a structure and a method for averaging bit-by-bit error pulses.

It is another object of the present invention to provide a means for coping with bursts of bad data in a digital communications system.

BRIEF DESCRIPTION OF THE DRAWINGS

For a more complete understanding of the present invention, and for further objects and advantages thereof, reference may now be had to the following detailed description of the invention taken in conjunction with the accompanying drawings wherein.

DETAILED DESCRIPTION OF THE INVENTION

To facilitate understanding of the present invention, it will be described herein in the form of a subcomponent of a logic module in an integrated circuit (IC). A particular application incorporating the IC, a cordless telephone application, will also be described. Such a discussion is particularly useful for those skilled in the art because an embodiment of the present invention like that described has been actually constructed and used with outstanding results. It should be kept in mind, however, that the invention described herein is not limited to cordless telephone applications. To the contrary, embodiments of the present invention may be employed in virtually any application requiring or improved by having an error-driven muting system. The particular embodiments of the present invention described herein are exemplary only.

Figure 1:
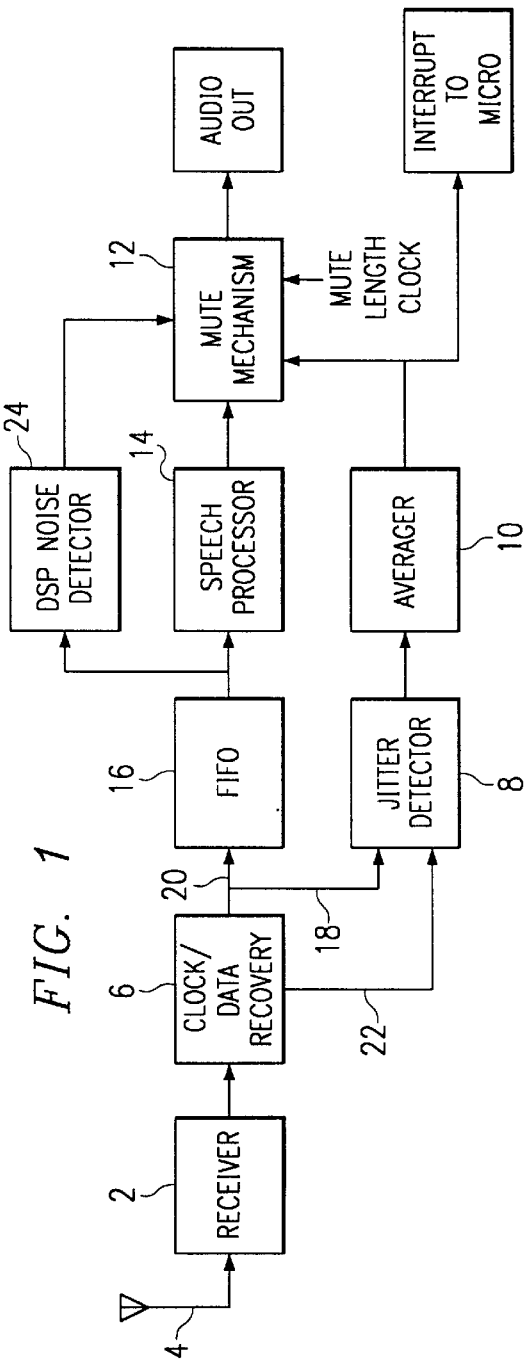
FIG. 1 is a block diagram of a digital signal receiving system including an averaging system according to the teachings of the present invention.

Referring now to FIG. 1, there is shown a digital signal receiving system including an averaging system according to the teachings of the present invention.

The digital signal receiving system shown in FIG. 1 receives a signal in a receiver 2 through an antenna 4. The received signal is forwarded to a clock/data recovery module 6 for determination of whether received bits of data are 1's or 0's.

As is known to those skilled in the art, as signal quality degrades the ability to recover the clock becomes poorer and the data itself shifts. Recognizing that the data comprises transitions or zero crossings, in normal, clean operations the clock prescribes sampling generally at the middle of a bit time, well away from zero crossings. As the signal degrades, however, transitions tend to shift continuously and unpredictably. This "phase jitter" can cause sampling problems if the zero crossings impinge or cross over sampling points. The jitter detector module 8 shown in FIG. 1 functions to indicate whether a predefined, "excessive" amount of phase jitter is present in the received signal.

In general, the jitter detector 8 operates by comparing where zero crossings actually take place to where they are expected to take place. The jitter detector 8 then creates a digital number for this time period difference. The jitter detector 8 further includes circuitry, generally which is user programmable, that generates a one bit time error for each instance when a zero crossing comes "too close" to a sampling point.

A shortcoming and deficiency of the prior art that is addressed by the present invention is the fact that these bit-by-bit error messages are not always meaningful. If, for example, data is being received at 72 kilobits per second, continual errors can produce 72,000 pulses per second, each existing only for one bit time. It has not been possible heretofore to consistently decide whether a received signal is noise or speech based upon single bit errors. It has also not been possible heretofore to detect bursts of bad data, causing complete loss of a meaningful signal.

The present invention derives meaning from a signal stream comprising single bit errors by "averaging" the received pulses. In the system depicted in FIG. 1, this "averaging" function is performed by averaging module 10. In an embodiment of the present invention this "averaging" can be effected by attenuating the received signal relatively quickly and then by removing the attenuating relatively slowly.

The relatively quick attenuation can be effected by attenuating an increasingly small amount, down to zero, for each received error bit. For example, from a starting point, a first bit error indication can cause an attenuation of x amount, a second indication can cause an attenuation of 0.75x, a third of 0.50x, a fourth of 0.25x and each subsequent indication can cause an attenuation of 0.00x or zero. At the zero additional attenuation level, maximum attenuation is being made.

The other operation, that of removing attenuation, can be effected relatively slowly by removing a small bit of attenuation for each period of time in which no bit error indication is received. For example, continuing the example presented in part in the paragraph immediately above, for each bit time in which there is no indication of an error, 0.01x amount of attenuation can be removed.

At this point, it is appropriate to discuss actual practical parameters that may be used in embodiments of the present invention. These parameters include "window size" and "average".

The "window" mentioned in the term "window size" is a period of time over which a "block" of averaging is effected. Window size has both a lower, or short, and upper, or long, limit. At the lower or short end one is bounded by the four bits of each ADPCM nibble; thus, in embodiments of the present invention, each "window" of averaging should comprise at least the amount of time passing during transmission of four bits. At the upper or long end there are two constraints. One of the constraints is the programmable mute length (effected by element 12 in FIG. 1). Mute length is the period of time after which no receipt of an indication of an error leads to removal of an amount of attenuation. If the window size is set larger than the mute length, the muting mechanism will not work. Accordingly, it is not practicable to establish a window size larger than the mute length. The other constraint that sets an upper limit on window size in the particular application described herein, a CT2 product, is the frame structure of the CT2 protocol. The CT2 protocol involves transmission of 64 bits of speech per frame in an alternating manner. That is, 64 bits are sent in a first millisecond, 64 bits are received in the next millisecond, and so forth. In this type of process, it would make no sense to generate errors only during the time data is being received and not when data is being sent. Thus, as a practical matter, an upper limit on the window size should be the burst length of 64 bits.

Referring back to FIG. 1, it may be seen that received data travels to both jitter detector 8 and to a speech processor 14 via FIFO 16. Lines 18 and 20 in FIG. 1 depict these two paths; line 22 depicts a clock signal line. The data signal is converted to an analog signal by the speech processor 14. The analog output of the speech processor 14 is muted by the mute mechanism 12, as appropriate, and then output.

Continuing to refer to FIG. 1 it may be seen that the FIFO 16 output also is transmitted to a DSP noise detector 24. The DSP noise detector 24 is another mechanism in the overall system that is depicted to detect noise. The DSP noise detector 24 also generates an output to the muting mechanism 12 that indicates whether noise is present.

As previously mentioned and discussed, a key aspect of embodiments of the present invention is window size over which averaging is to be effected. Additionally, it is important to determine the number of errors within a window which lead to a conclusion that noise is present.

Figure 2:
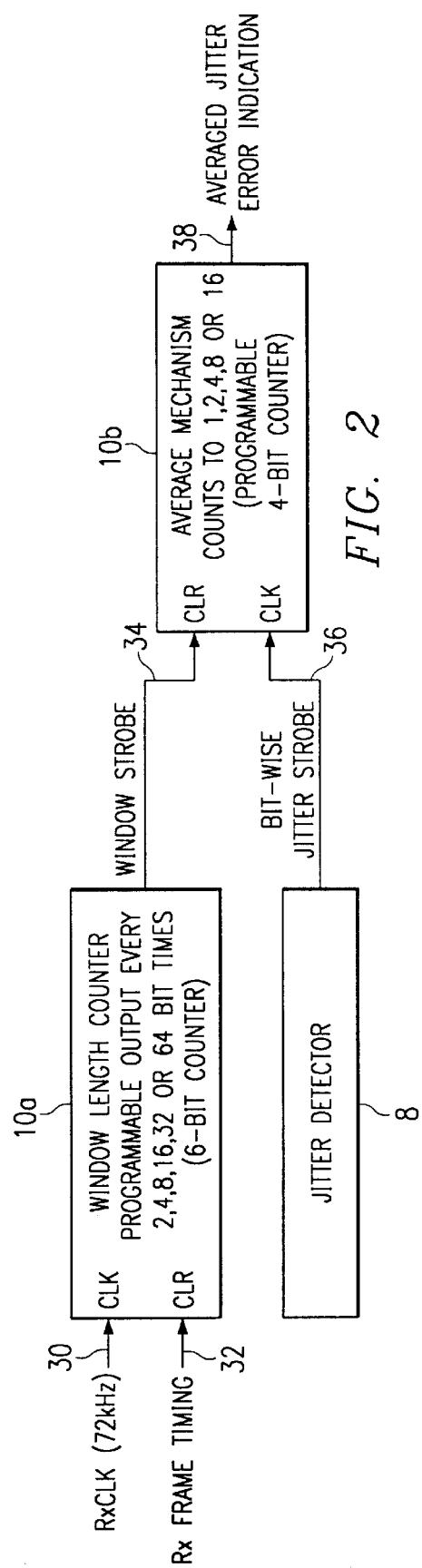
FIG. 2 is a block diagram of certain elements shown in FIG. 1, depicting further details about those elements.

Referring now to FIG. 2, there is shown a more detailed view of an averaging mechanism according to the teachings of the present invention. Jitter detector 8 in FIG. 2 corresponds to jitter detector 8 in FIG. 1. Both elements 10a and 10b in FIG. 2 comprise the averager 10 shown in FIG. 1.

The window length counter 10a shown in FIG. 2 determines window length. The window length counter 10a depicted comprises a programmable six-bit counter. Coming into the counter 10a is a receive clock signal 30 and a frame timing signal 32. The counter 10a functions to tell the number of received clocks which are the bit boundaries that are being received, based upon the content of the signal 30. The frame timing signal 32, on the other hand, resets the counter 10a.

In the depicted embodiment of the present invention, which, as previously mentioned, is especially designed for incorporation into a cordless telephone, the received signal 32 is a signal that specifies the received portions only of transmissions complying with the CT2 protocol. The signal 32 resets the counter 10a at the beginning of each received window. Counting is then performed by the counter 10a, up to the predetermined, programmed number. With a six-bit counter, as depicted in FIG. 2, programmable output can easily be provided every 2, 4, 8, 16, 32, or 64 (i.e., $2^6$) bit times. If, for example, the programmed number of bits is eight, three bits of counter is the effective counter and each time the counter 10a gets to the terminal count (eight) it changes the output stage. Also, of course, the counter is completely reset at the receive frame boundary by the signal 32 as previously mentioned.

Referring still further to FIG. 2, it may be seen that the window length counter 10a outputs a window strobe signal 34. This window strobe signal 34 is transmitted to element 10b, a "clearing" or an "averaging" mechanism.

Continuing to use the example discussed with respect to counter 10a above, signal 34 provides pulses at eight bit intervals, thus defining a plurality of eight bit time windows. In addition to receiving these window pulses, the average mechanism 10b shown in FIG. 2 also receives a bit-wise jitter strobe signal 36 from the jitter detector 8. In the embodiment shown in FIG. 2, the average mechanism 10b is a programmable four-bit counter, which is capable of counting to 1, 2, 4, 8, or 16. With this counter, the average mechanism 10b "counts" the output of the jitter detector, that is, it counts number of errors bit-by-bit.

Building upon the example above, the average mechanism 10b can, for example, be programmed to count to two. In such a case, if the counter in mechanism 10b does not count two errors in an eight bit window defined by signal 34, the mechanism 10b generates no output and it continues counting. If, on the other hand, the counter in mechanism 10b does count to two or higher in the eight bit window, it will generate an output and that output will be present from the time it counts to two, at least, until it is cleared.

Preferred embodiments of the average mechanism of the present invention will also include means for addressing a situation in which the very last bit in a window is a triggering error. That is, continuing to use the eight/two example, a situation may arise in which the counter 10a is set to eight, the average mechanism 10b is set to two, and the eighth bit is the second error. In that case, the average mechanism 10b could be set and then immediately cleared. To prevent such "late" errors from not registering, preferred embodiments of the present invention may include some mechanism, e.g., conventional hardware delaying mechanisms, to hold the averaged jitter error indication (signal 38 in FIG. 2) for a measurably significant period of time.

Based upon the foregoing, those skilled in the art should now understand how elements 10a and 10b shown in FIG. 2 cooperate to possibly generate an error indication output 38 that lasts for no longer than a predetermined window period. Referring back to FIG. 1, it may be seen that the indication signal is transmitted to the mute mechanism 12. The mute mechanism 12 can then implement an attenuating/deattenuating system such that described hereinabove. Elements 10a and 10b provide the mechanism 12 an indication of whether a prescribed number of errors (enough to warrant action to be taken because of the number of those errors) has occurred within a predetermined time period. Both parameters, number of errors and window size, are easily changed, scaled, or otherwise set based upon best performance in a particular application.

Figure 3A:
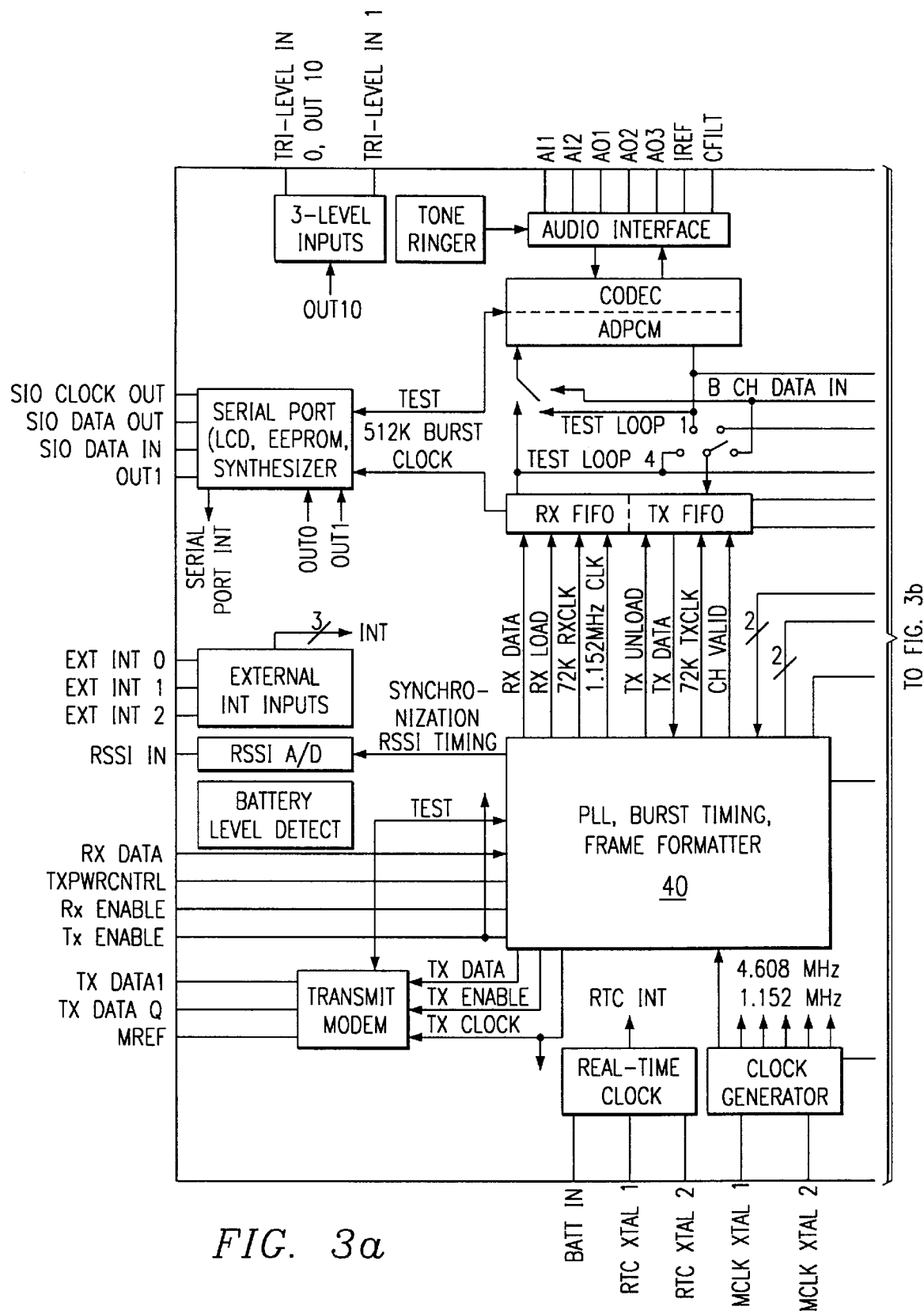
FIGS. 3a and 3b are a block diagram of an integrated circuit into which the averaging system of the present invention may and has been incorporated.
Figure 3B:
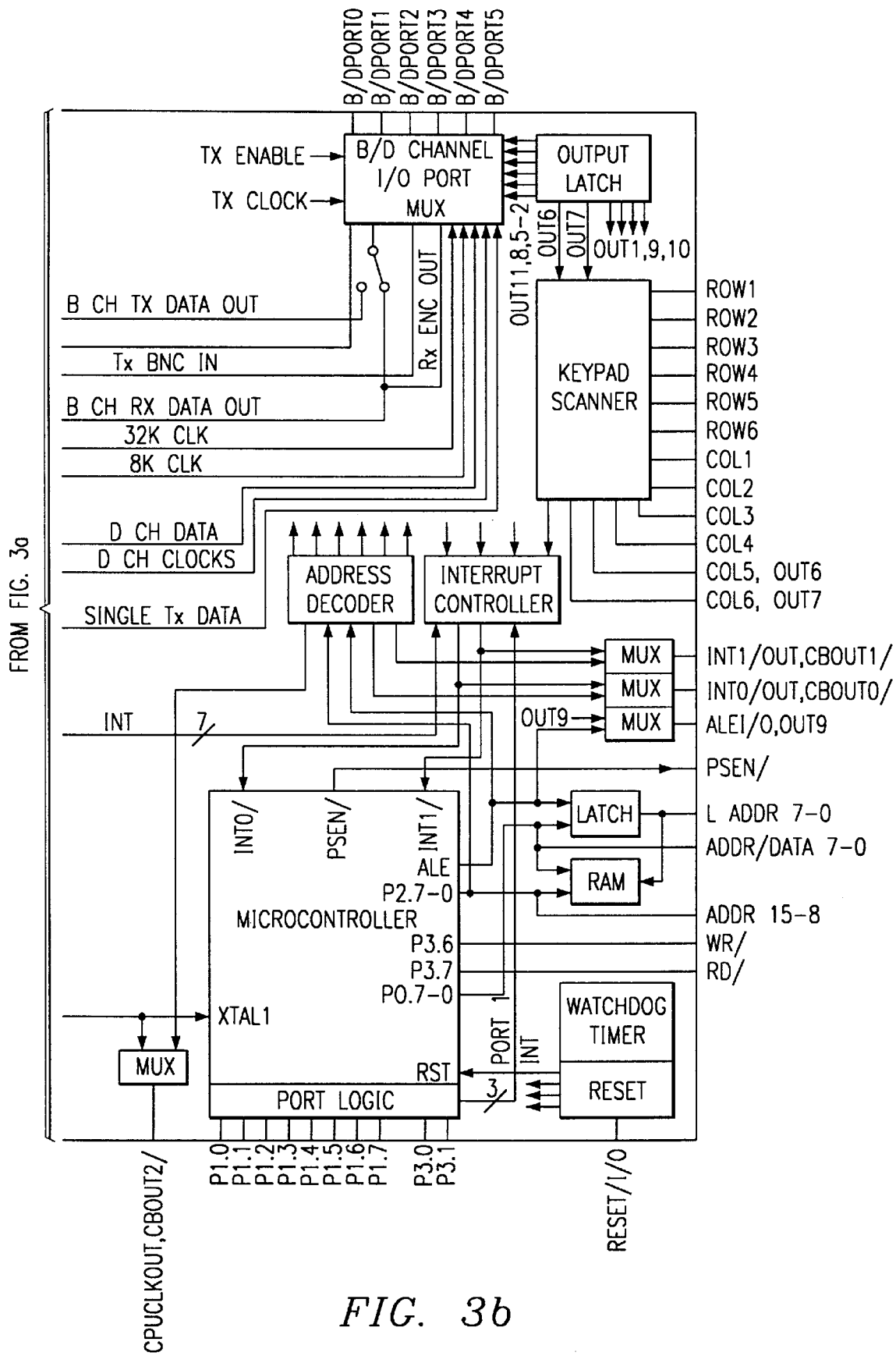
Figure 4:
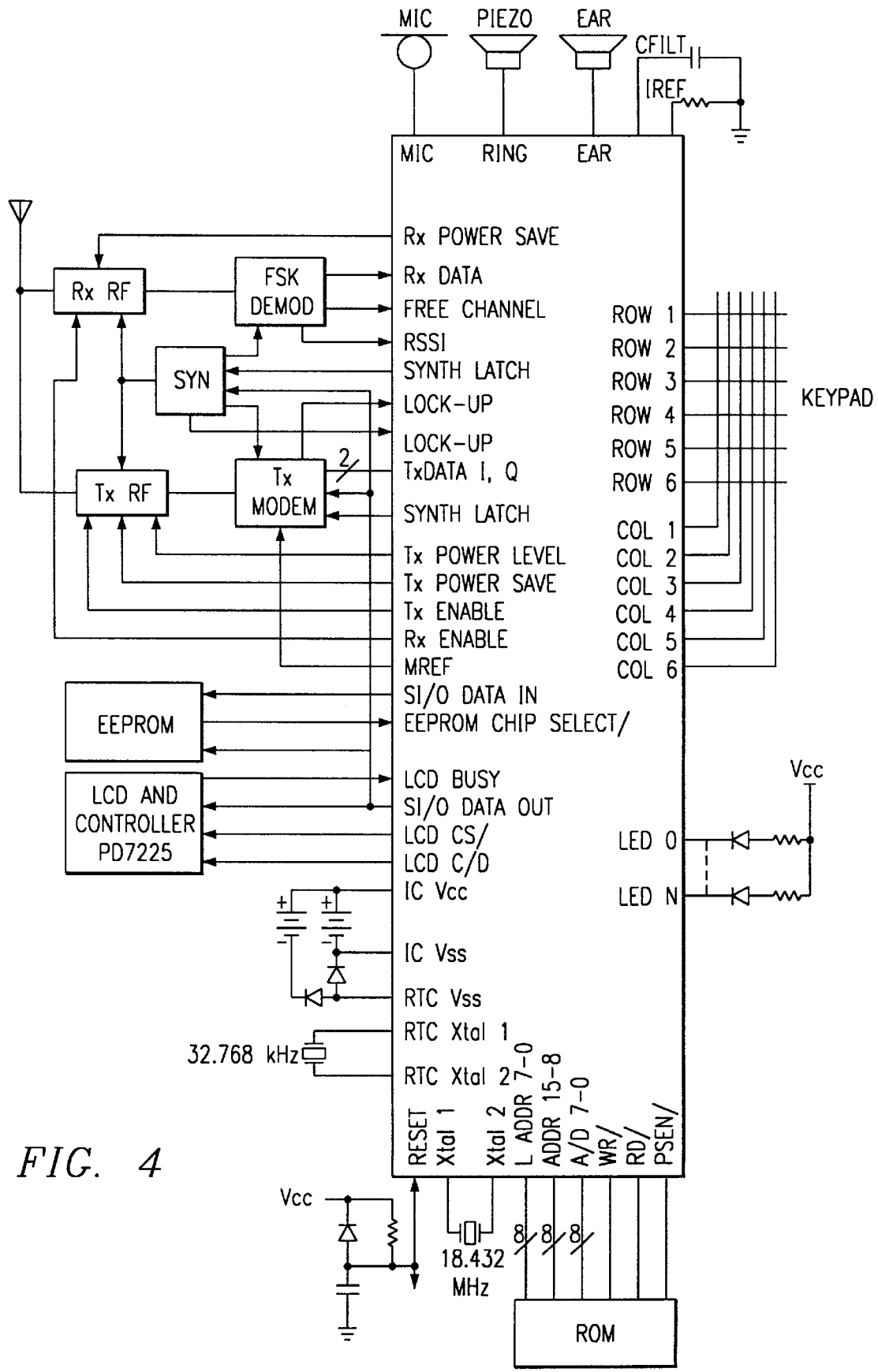
FIG. 4 is a block diagram of a cordless telephone terminal unit into which the integrated circuit of FIGS. 3a and 3b are incorporated.
Figure 5:
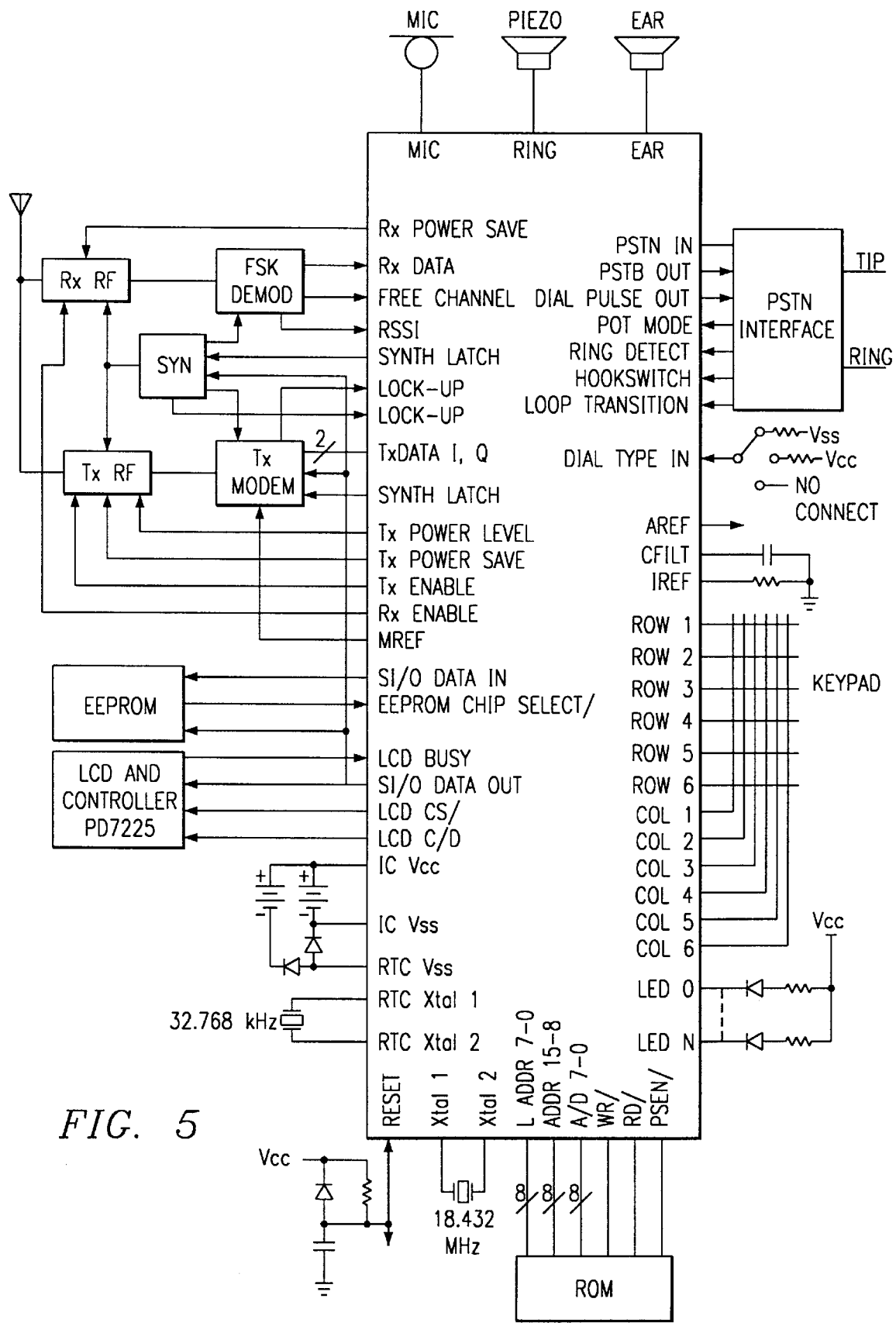
FIG. 5 is a block diagram of a cordless telephone base station into which the integrated circuit of FIGS. 3a and 3b are incorporated.

For convenience and clarity in understanding the foregoing description of the present invention, FIGS. 3a, 3b, 4, and 5 are included herein. FIGS. 3a and 3b combine to show a block diagram of an integrated circuit including the averaging mechanism of the present invention. Further details regarding this IC are set forth at length in various of the related cases (t, identified in the cross reference section above; it suffices herein to point out that the jitter detector 8 and averaging mechanism 10 are both located in logic module 40 shown in FIG. 3a. FIGS. 4 and 5, also described at length in various of the related cases, especially the one entitled INTEGRATED CIRCUIT AND CORDLESS TELEPHONE USING THE INTEGRATED CIRCUIT, describes how the IC of FIGS, 3a and 3b may be incorporated into a cordless telephone.

Obviously, numerous modifications and variations are possible in view of the teachings above. Accordingly, within the scope of the appended claims, the present invention may be practiced otherwise than as specifically described hereinabove.

What is claimed is:

1. A digital signal receiving system comprising:

a receiver that receives a digital signal and outputs a clock signal and a related data signal;

a jitter detector that receives said clock signal and said related data signal from said receiver and which outputs a stream of bit-by-bit jitter error pulses;

an averaging mechanism that receives said stream of bit-by-bit jitter error pulses from said jitter detector and which counts errors over windows of a predetermined size and which generates an error indication output signal if a predetermined number of errors is detected in a particular window;

a speech processor operating in parallel with said jitter detector and said averaging mechanism for converting said digital signal to an analog signal; and a muting mechanism that receives said error indication signal from said averaging mechanism, said muting mechanism comprising means for attenuating said analog signal if errors reach a predetermined level and means for deattenuating said analog signal if errors do not reach said predetermined level.

2. A system as recited in claim 1, wherein said averaging mechanism comprises:

means for isolating bits in said digital signal into groupings of bits, each grouping being of a predetermined size;

means for counting the number of errors that occur within each grouping; and means for generating an error indication output signal when a predetermined number of errors occurs within a grouping of bits.

3. A system as recited in claim 2, wherein said averaging mechanism further comprises means for resetting said means for counting once counting of a grouping of bits is completed.

4. A system as recited in claim 3, wherein said averaging mechanism further comprises means for deactivating said means for generating, said means for deactivating operating in conjunction with said means for resetting.

5. A system as recited in claim 1, wherein said means for isolating comprises a programmable up counter that generates an output window strobe signal.

6. A system as recited in claim 5, wherein said means for counting comprises a programmable up counter that receives said window strobe signal from said means for isolating and that generates said error indication output signal.

7. An average jitter error indication apparatus for detecting data shifts in degraded digital signals, comprising:

a jitter detector;

a window length counter adapted to receive at least a clock signal and a frame timing signal, and to produce a window strobe signal which defines a window time; and an averaging mechanism adapted to receive said window strobe signal and a bit-wise jitter strobe from said jitter detector, and to produce an average jitter error indication signal, said averaging mechanism comprises a first programmable counter adapted to count bits of said bit-wise jitter strobe during said window time.

8. The average jitter error indication apparatus of claim 7, wherein said window length counter comprises a second programmable counter which counts to a predetermined number to define said window time, said second counter counting bits of said clock signal.

9. The apparatus of claim 8, wherein said frame timing signal resets said second programmable counter.

* * * * *

UNITED STATES PATENT AND TRADEMARK OFFICE
CERTIFICATE OF CORRECTION

PATENT NO : 5,993,057
DATED : November 30, 1999
INVENTOR(S): Gulick, et al.

It is certified that error appears in the above-identified patent and that said Letters Patent are hereby corrected as shown below:

Column 1, line 5      Replace "appliction"
                      With --application--

Column 1, line 41     Replace "Citcuit"
                      With --Circuit--

Column 1, line 44     Replace "Generartion"
                      With --Generation--

Column 7, line 36     Delete "(t,"

Column 7, line 43     Replace "FIGS,"
                      With --FIGS.--

Signed and Sealed this

Tenth Day of April, 2001

Attest:

NICHOLAS P. GODICI

Attesting Officer    Acting Director of the United States Patent and Trademark Office